United States Patent [19]
Mathews

[11] 3,756,248
[45] Sept. 4, 1973

[54] ROCK TRAP FOR COMBINES
[76] Inventor: Bernard C. Mathews, P. O. Box 70, Crystal Lake, Ill. 60014
[22] Filed: Apr. 10, 1972
[21] Appl. No.: 242,530

[52] U.S. Cl. .............................................. 130/27 JT
[51] Int. Cl. ............................................. A01f 12/26
[58] Field of Search ...................... 130/27 JT, 27 J, 130/27 L

[56] References Cited
UNITED STATES PATENTS
3,209,760  10/1965  Claas .............................. 130/27 JT
2,743,728  5/1956  Carlson ............................ 130/27 J Primary Examiner—Antonio F. Guida
Attorney—Zabel Baker York and Jones

[57] ABSTRACT

A rock trap, located between the feeder and the adjustable concave, is in the form of a transversely slidably mounted tray. The casing has an access door through which the tray can be slid out, the rocks removed, and the tray returned to its operative position. The tongue and groove mounting means permit the tray to be removed, inverted, reversed and returned so that the bottom of the tray serves as a guide plate extending from the feeder to the concave. In either position, one edge of the tray structure is supported from the concave so as to provide a flush entry onto the concave in any one of its adjusted positions.

11 Claims, 5 Drawing Figures

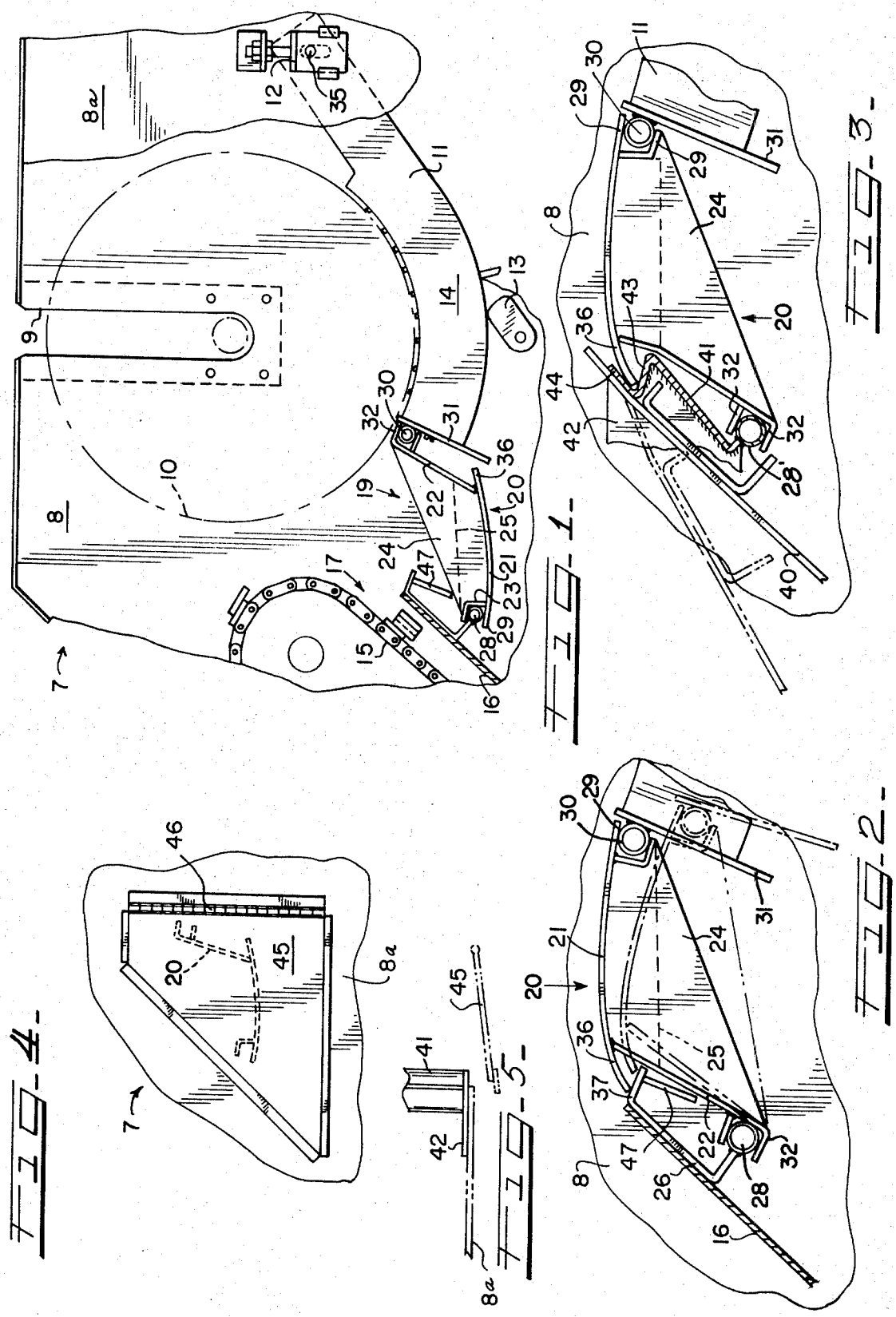

ROCK TRAP FOR COMBINES

This invention relates to improved rock trap for combines.

Various means have been proposed for preventing rocks, picked up by the harvesting head of a combine, from damaging the threshing cylinder and concave. Some of these means involve ejecting the rocks through a trap door, as shown in my earlier U.S. Pat. No. 3,527,233 dated Sept. 8, 1970, and others may merely provide a fixed receptacle into which the rocks drop. In the latter class of device, in order to remove the rocks from the receptacle it is necessary to remove the feeder in order to get one's hand in the receptacle and pick out the rocks.

According to my invention, I provide a rock trap in the form of a transversely sliding tray, together with an access door in the wall of the combine casing so that the tray may be drawn out and the rocks removed, and then the tray pushed back into position.

Also, I utilize the front plate of the concave as the rear support for the tray. Since the concave is adjustably mounted for movement toward and away from the threshing cylinder, certain problems are encountered in that the tray mounting means must accommodate this adjusting movement, and the arrangement must avoid disengagement of the support connection.

According to this aspect of my invention, I provide a support connection which comprises a cylindrical tongue surface and a groove which cooperate to permit angular movement of the tray with respect to the concave as the concave is adjusted. With this arrangement, it is possible to locate the parts so that they do not pull away from each other and disengage. In the preferred form, the tubular element is the support, and the grooved element is associated with the tray, although the relative functions may be reversed. A further characteristic of this connection is that the engagement of a cylindrical surface with the plane wall of the groove provides a somewhat more smoothly operating sliding connection than two overlapping flanges.

In early harvesting of high moisture corn, when the stalks are still green, the receptacle arrangement is not entirely satisfactory for the reason that sections of tough green stalk and long unshrunken corn ears may interlace in the receptacle and interfere with the feed to the cylinder. As the high moisture green stalk corn is generally standing well and is harvested with snapping rolls set high so that there is no change of picking up rocks, the rock trap is unnecessary for such early harvesting.

According to my invention, I provide a combination rock trap and guide plate of which the guide plate facilitates movement of the leaves and stalks into the space between the cylinder and concave, thus avoiding pile up in the tray. More specifically, my invention provides an invertable structure which in its upright position presents a tray type of rock trap, and in its inverted position presents a guide plate which bridges the gap between the feeder and the threshing cylinder, the support connection being equally effective for either the upright or the inverted position.

Furthermore, the rear edge of the guide plate is flush with the upper front surface of the concave and maintains this registration throughout all adjusted positions of the concave.

Other objects, features and advantages will become apparent as the description proceeds.

In the drawings:

FIG. 1 is an elevation of the upper front portion of a combine, with one casing wall broken away, and the threshing cylinder omitted for purpose of clarity;

FIG. 2 is a view of the rock trap in its inverted position, a changed position of the parts being shown in broken lines;

FIG. 3 is a view similar to FIG. 2 but showing a modified mounting means for the rock trap;

FIG. 4 is a fragmentary elevation of the side wall of the combine showing the access door, the location of the rock trap being indicated in broken lines; and FIG. 5 is a fragmentary plan view of the Z-section of FIG. 3 showing the end brackets, the casing wall being shown in phantom.

In FIG. 1, the casing 7 has side walls 8 and 8a which are slotted at 9 to accommodate the bearings of the threshing cylinder, the location of which is indicated by the dot and dash line 10. Beneath the cylinder is the concave 11 supported at the rear by an adjustable bracket support 12, and at the front by cams 13 which bear against the side plates 14 of the concave, the arrangement being described in greater detail in my copending application, Ser. No. 207,444, filed Dec. 13, 1971, to which reference is hereby made.

Located forwardly of the concave 11 is a feeder 15 having a bottom transverse wall 16, shown in FIG. 1. The region above the upper edge of the bottom wall 16 constitutes the outlet 17 of the feeder. There is a gap 19 between the outlet 17 and the concave 11. The feeder ejects the cut crop across the gap 19 and into the threshing space between the cylinder 10 and concave 11.

The rock trap is in the form of a removable tray 20 having a bottom wall 21, a rear wall 22, a shallow front wall 23, and side walls 24. These parts are made of ⅛-inch steel plate and are welded to each other. A plurality of reinforcing ribs 25 extend from the front to the back walls at intermediate points between the side walls 24.

Means are provided for slidably supporting the tray 20 beneath the gap 19 so that it can be withdrawn transversely from the casing 7 to remove the rocks therefrom.

In the embodiment shown in FIGS. 1 and 2, the bottom wall 16 is fixed within the casing 7. A channel 26 is secured to the under surface of the wall 16. A tubular member 28 is welded to the lower flange of the channel 26. The channel 26 thus constitutes a fixed mounting member for the front tray support 28. A second tubular member 30 is welded to the front plate 31 of the concave 11, providing the rear tray support.

The tray 20 is provided with grooves, or double flanges 29 and 32 respectively, into which the tubular members 28 and 30 extend, thus providing a slidable connection between the tray and its supports. The contact between the cylindrical surface of the tube and the plane surface of the flange provides a good sliding contact.

In operation, the cut crop which moves upwardly along the bottom wall 16 is thrown by the feeder 15 with a considerable momentum across the gap 19.

Some of the material will go directly into the threshing space between the cylinder and the concave, some will hit the bars of the cylinder and be carried into the threshing space, and some will drop into the tray. Any rocks thrown out by the feeder will either bounce back from the bars of the cylinder into the tray 20, or will drop directly into the tray. The rocks dropping into the tray will displace an equivalent amount of cut crop which will then move rearwardly into the threshing space between the cylinder 10 and the concave 11.

As previously indicated, when harvesting early high moisture corn it is desirable to substitute a guide plate for the tray. My tray is designed so that when inverted, the bottom of the tray presents a smooth surface bridging the gap 19.

Since the rear edge of the guide plate should be substantially flush with the upper front surface of the concave 11, the guide plate is supported at the rear end from the concave. Thus, as the concave is adjusted toward and away from the cylinder by cams 13, proper registration will be maintained.

The concave at its rear end has a pin 35 which is engaged by the adjustable bracket support 12 so that operation of the adjusting cams 13 will cause the concave to pivot about point 35 whereas the tray structure 20 pivots about the front tray support tube 28. The tube 28 and the pin 35 are fixed points, and preferably the tube 30 is in substantial alignment with points 28 and 35. This means that the variation in the sum of the distances 28–30 and 30–35 between the two positions shown in FIG. 2 is negligible even though the adjustment results in an appreciable horizontal movement of the front edge 36 of the element 21.

Due to this horizontal movement of the edge 36, the fixed support mounting member 26 includes a substantially horizontally disposed portion 37 which underlies the edge 36 of element 21 to prevent the development of a gap between the edge 36 and the feeder bottom 16. In the FIG. 2 embodiment, this horizontal portion 37 is the upper flange of the channel 26. The edge 36 of the element 21 thus overhangs the wall element 22 so that the latter will clear the flange 37.

In some combines the feeder, including the feeder wall 40, are mounted for angular adjustment, as shown in dotted lines in the embodiment of FIG. 3. In such instances, the fixed support mounting member 41 for the tube 28' must be structurally independent of the feeder wall 40. For instance, the ends of the support member 41 may be secured to brackets or plates 42, shown in FIGS. 3 and 5, and these in turn are welded to the casing structure, such as casing walls 8 and 8a. In this FIG. 3 modification, the support mounting member 41 is in the form of a Z-section providing a substantially horizontal surface 43 for cooperation with the edge 36. The Z-section provides a strong and rigid element which is capable of bridging the distance between the casing wall 8–8a without intermediate support, although such intermediate support can be provided, if desired.

In each embodiment, the structure 20, including the edge 36, pivots about the front tray support 28 which is a fixed center. The substantially horizontal surface 37, 43 is disposed substantially perpendicular to a line connecting the surface portion 37, 43 with the front tray support 28 so that the small magnitude of any clearance between the surface 37, 43 and the edge 36 may be maintained for the various adjusted positions of the concave.

In FIG. 3, it will be noted that the Z-section 41 includes an upper lip 44 against which the feeder bottom 40 may bear in its various adjusted positions to provide a rubbing seal against feed loss.

The element 21 is preferably curved, as shown, and provides a smooth surface bridging the gap 19. However, the exact shape of the element 21 will vary with the geometry of the other parts of the device, including the horizontal surface 37 or 43.

As shown in FIG. 4, the casing wall 8a is provided with an access door 45 mounted on the casing by a piano hinge 46. Thus, the rocks are removed by opening the door 45 and sliding out the tray so that the rocks may be picked out. In the FIG. 2 embodiment, a strip 47 depends from the upper flange 37 of channel 26 which tends to prevent rocks from moving forwardly into the channel 26 so that they would drop down on the sleeve structure as the tray is being withdrawn. In the FIG. 3 embodiment, the shape of the Z-section 41 prevents this from occurring.

In either the upright or inverted positions of the tray, the grooves 29, 32 will not pull away and become disengaged from the tubular supports 28, 30 due to the substantial alignment of the support 30 with the line connecting the points 28 and 35. However, due to the greater elevation of the rear support 30 over the front support 28, the tray structure 20 is reversed from front to back when inverted so that the bottom wall 21 is substantially horizontal when in inverted position.

Although only preferred embodiments of my invention have been shown and illustrated herein, it will be understood that various modifications and changes can be made in the constructions shown without departing from the spirit of my invention, as pointed out in the appended claims.

I claim:

1. A rock trap for a combine having a casing, a feeder, and an adjustable concave, with the outlet of said feeder and the front plate of said concave being horizontally spaced from each other, said rock trap comprising a tray structure located between same, means mounted on said concave for supporting the rear end of said tray structure, means for supporting the front end of said tray structure, both of said support means engaging said tray structure to permit transverse sliding movement of said tray structure, said casing including side walls, and a door in one of said side walls adjacent to said tray structure and separate therefrom to provide access to said tray structure to permit the same to be withdrawn in a transverse direction from said support means.

2. A rock trap as claimed in claim 1 in which said tray support means each comprises an elongate transverse member having a substantially cylindrical tray engaging surface, said tray structure having means providing a front groove and a rear groove engaging the cylindrical surfaces of said support means to accommodate relative angular movement of said tray incident to adjusting movement of said concave.

3. In a combine having a feeder and a concave with the outlet of said feeder and the front plate of said concave being horizontally spaced from each other, a tray structure located between same, means mounted on said concave for supporting the rear end of said tray structure, means for supporting the front end of said tray structure, both of said support means engaging said tray structure to permit transverse sliding movement of said tray and being adapted for engagement with said tray structure when said tray structure is inverted, the undersurface of the bottom wall of said tray structure constituting a guide plate extending from said feeder outlet to said concave when said tray structure is inverted, the rear end of said guide plate being substantially flush with the front of the upper surface of said concave.

4. The combination as claimed in claim 3 in which said tray structure includes a rear wall and a front wall, said rear tray support means engaging the upper end of said rear wall, and said front tray support means engaging said tray structure near said bottom wall, and said tray structure being reversed from front to back when in inverted position so that said bottom wall in either position is substantially horizontal.

5. The combination as claimed in claim 4 in which the edge portion of said guide plate extends beyond said rear wall so that when said tray structure is in inverted and reversed position, the front edge portion of said guide plate extends forwardly, a fixed transverse member for mounting said front tray support means, said fixed support mounting member having a substantially horizontal portion located above said front tray support means and located beneath said front edge portion.

6. The combination as claimed in claim 5 in which said fixed support mounting member is mounted on said feeder.

7. The combination as claimed in claim 5 in which said combine has a casing enclosing said concave, said feeder being adjustably mounted with respect to said casing, and said fixed support mounting member being mounted in said casing and being structurally independent of said feeder.

8. The combination as claimed in claim 3 which includes pivot means for supporting the rear end of said concave, cam means for adjusting the angular position of said concave with respect to said pivot means, said front tray support being fixed, and said rear tray support means being located in substantial alignment with a line connecting said front tray support means and said pivot means.

9. In a combine having a feeder and an adjustably mounted concave with the outlet of said feeder and the front plate of said concave being horizontally spaced from each other, a tray structure located between same, means mounted on said concave for supporting the rear end of said tray structure, means for supporting the front end of said tray structure, both of said support means engaging said tray structure to permit transverse sliding movement of said tray, pivot means for supporting the rear end of said concave, means for adjusting the angular position of said concave with respect to said pivot means, said front tray support being fixed, and said rear tray support means being located in substantial alignment with a line connecting said front tray support means and said pivot means.

10. In a combine having a feeder and an adjustably mounted concave with the outlet of said feeder and the front plate of said concave being horizontally spaced from each other, a tray structure located between same, means mounted on said concave for supporting the rear end of said tray structure, fixed means for supporting the front end of said tray structure, both of said support means engaging said tray structure to permit transverse sliding movement of said tray, pivot means for supporting the rear end of said concave, means for adjusting the angular position of said concave with respect to said pivot means, said front tray support being fixed, and said rear tray support means being located in substantial alignment with a line connecting said front tray support means and said pivot means, both of said support means being adapted for engagement with said tray structure when said tray structure is inverted and reversed, the undersurface of said bottom wall of said tray structure constituting a guide plate extending from said feeder outlet to said concave when said tray structure is inverted and reversed, said tray structure including a rear wall with the bottom wall of said tray structure extending beyond the bottom of said rear wall so that when said tray structure is in inverted and reversed position, the front edge of said guide plate extends forwardly beyond said inverted and reversed rear wall, and a fixed mounting member for said front tray support means, said fixed mounting member having a portion located above said fixed front tray support means and providing an upwardly facing surface substantially perpendicular to a line connecting the midpoint of said surface portion and said fixed front tray support means, said surface portion being located beneath and closely adjacent said front edge and cooperating therewith to prevent development of a gap between said front edge and said fixed mounting member during angular movement of said front edge away from said mounting member and about said fixed front tray support means incident to adjustment of said concave.

11. The combination as claimed in claim 1 which includes pivot means for supporting the rear end of said concave, cam means for adjusting the angular position of said concave with respect to said pivot means, said front tray support being fixed, and said rear tray support means being located in substantial alignment with a line connecting said front tray support means and said pivot means.

* * * * *